United States Patent [19]

Mason, Jr.

[11] 4,286,136

[45] Aug. 25, 1981

[54] COOKING CONTAINER FOR MORE EFFICIENT COOKING IN A MICROWAVE OVEN

[76] Inventor: Stanley I. Mason, Jr., 61 River Rd., Weston, Conn. 06880

[21] Appl. No.: 101,630

[22] Filed: Dec. 10, 1979

[51] Int. Cl.$^3$ ............................................. H05B 6/64
[52] U.S. Cl. ..................... 219/10.55 E; 219/10.55 M; 426/110; 426/243; 206/511; 99/444; 99/425
[58] Field of Search ................. 219/10.55 E, 10.55 R, 219/10.55 F, 10.55 M; 426/110, 112–115, 107, 234, 241–243; 220/70, 72, 74; 229/2.5 R, 3.5 MF; 206/505, 507, 511, 512, 518; 99/451, 444–446, 425, DIG. 14, 449; 126/390; D7/96, 43

[56] References Cited

U.S. PATENT DOCUMENTS

| | | | |
|---|---|---|---|
| 3,037,677 | 6/1962 | Debs | 229/3.5 MF |
| 3,361,576 | 1/1968 | Jacobson | 426/110 X |
| 3,859,493 | 1/1975 | Peterson | 219/10.55 R |
| 3,994,212 | 11/1976 | Wong | 219/10.55 E X |
| 4,013,798 | 3/1977 | Goltsos | 219/10.55 E X |
| 4,074,102 | 2/1978 | Asen | 219/10.55 E |
| 4,132,811 | 1/1979 | Standing et al. | 219/10.55 E X |
| 4,140,889 | 2/1979 | Mason, Jr. et al. | 219/10.55 E |
| 4,158,760 | 6/1979 | Bowen et al. | 219/10.55 E |

FOREIGN PATENT DOCUMENTS 406782 4/1974 U.S.S.R. .................................... 206/505

Primary Examiner—Gene Z. Rubinson
Assistant Examiner—Philip H. Leung
Attorney, Agent, or Firm—Parmelee, Johnson, Bollinger & Bramblett

[57] ABSTRACT

A food container is provided for efficiently cooking foods in a microwave oven and for serving them at the table. By use of the container, the food is cooked positioned vertically within the oven so that it absorbs both direct microwave radiation and microwave radiation reflected from the walls and floor of the oven. The container can be used to display the food in a store in a vertical position, cook it in a vertical position, and serve it in a horizontal position. It may then be disposed of after one use. The container is designed to use the weight of th food itself to position the center of gravity of the container and food so that the filled container will balance in a vertical position and therefore, no extending supporting base is needed. The container can be readily blow molded, thermo formed or injection molded and, consequently, is inexpensive to produce. The container, which is formed from thin and flexible plastic or paper board and has an open top, is also economical to manufacture because it requires less material than solid containers.

19 Claims, 10 Drawing Figures

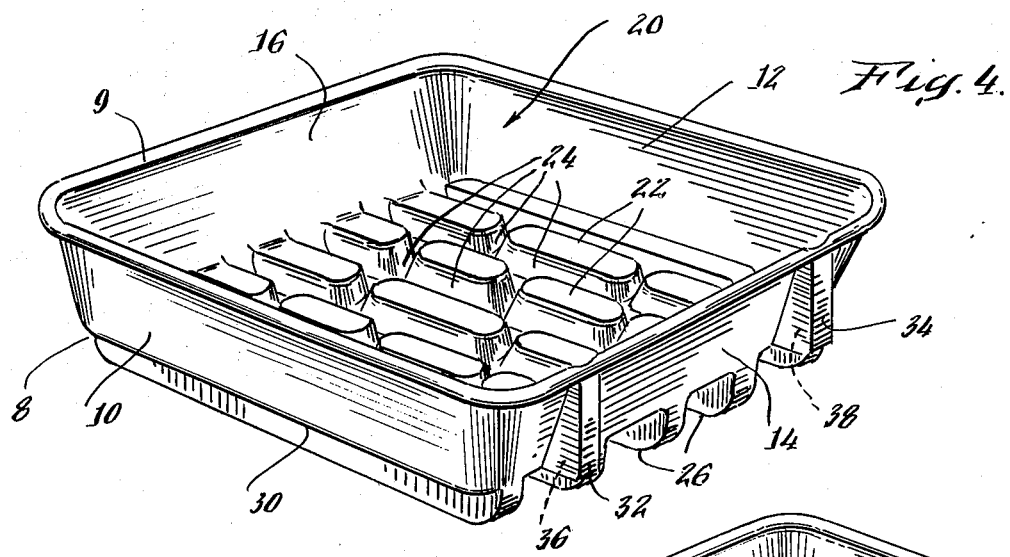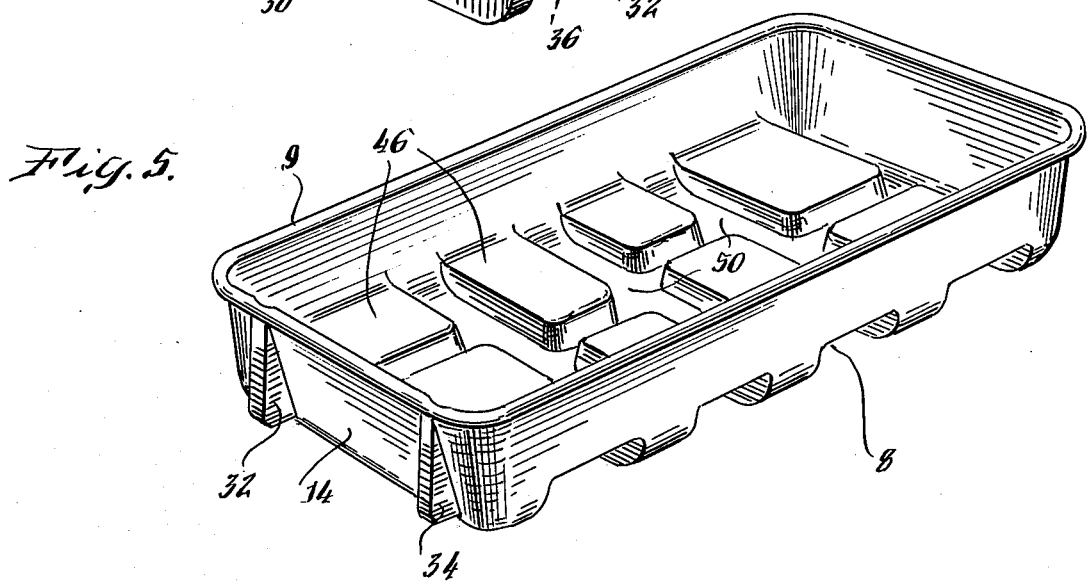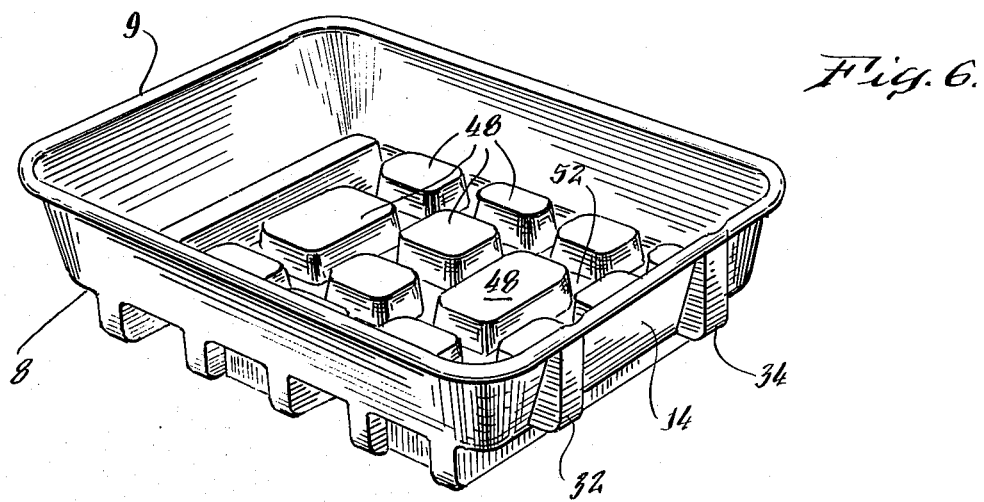

COOKING CONTAINER FOR MORE EFFICIENT COOKING IN A MICROWAVE OVEN

BACKGROUND OF THE INVENTION

To understand the importance of the invention discussed herein, it will be helpful to have a background in the following areas that play major roles in microwave ovens and their use. The first area of discussion is the nature of microwave energy, its application to cooking, and its effects on liquids. The second area of concern is the makeup of foods and their reaction to microwave energy. The third area to be discussed is the positioning of the food to be cooked within the microwave oven cavity to achieve optimum results.

Microwaves are a form of electrical energy that resemble radio waves. These waves are disseminated within a microwave oven cavity in a random manner. They bounce off the six sides that make up the cavity. The energy is both radiated onto, and reflected off the walls. Liquids react to microwaves more than solids for the molecules are able to move, and therefore react, due to the amorphous nature of liquids.

Foods consist mostly of liquids or moisture. On a cellular level, organic foods consist of approximately 80% water. The reason for heating foods is to soften the cell walls so that the nutrients are more readily available. When the cell walls are uncooked, there is more need for physical means to break down the cellular content of the food via chewing. Conversely, when a food is over-cooked, the cell walls are either burned or they lose their water. Loss of water also makes the food unpalatable. Also, the nutrients are often lost with the water vapor. In microwave cooking the water absorbs the energy and heats the solid portion by conduction. We are concerned with even equal heating of the food so that all the food attains the same degree of cell softening in the same period of time. This provides optimum availability of nutrients.

The best way to secure these benefits in the microwave oven is to suspend the food in a vertical position so that it does not rest on or against any of the six walls of the oven cavity. In the example we will use, the relative values will remain constant throughout. We will use a package of frozen peas that is a solid rectangle with the dimensions of $4'' \times 3'' \times 1''$. Vertical positioning calls for the 4" side to be vertical. In the horizontal attitude, the 1" side is vertical. The internal dimensions of the microwave oven cavity are 12" high, by 14" wide, by 10" deep. These spacial relationships are depicted in FIG. 1A. The relative positions have a definite effect on the evenness of cooking. If one suspends the block of vegetables vertically, 100% of the surface area of the block is available for energy penetration. If the block is placed on the floor of the oven (the most general way to cook in the microwave oven), depending on the side placed on the floor of the oven, from 7.9% to 31.5% of the total surface area of the block of frozen peas is lost to "equal energy penetration" due to its positioning (FIG. 1B).

However, cooking such foods in the vertical position presents a problem of stability. One solution to this problem is to provide a container with an extending supporting base to hold the container in a vertical position. This solution is inadequate because a base would interfere with the container when it is in a horizontal position, making it difficult to ship the container in a case with other containers and also making it undesirable for use as a serving dish.

It is readily apparent that if the block is suspended in the vertical position, discussed earlier, in the center of the oven cavity it will receive energy more evenly than any other attitude. This reduces by one-half the distance the microwave energy has to travel to reach any molecule. Returning to our example of the frozen peas (a block: $4'' \times 3'' \times 1''$), the shortest distance that would have to be traveled would be $\frac{1}{2}''$. More even cooking is obvious because one-half of the energy enters the food from both front and back simultaneously, rather than from only one side, all at once. When the block is horizontal (one side of the cube resting on the floor of the oven), it receives energy from the top, 2 edges, 2 ends, but not the bottom: it is 17% less effective, when one considers the exposed surface area (only 5/6th of the surface is exposed to direct radiation when compared with the vertical position).

Positioning, therefore, can make a significant difference in the evenness of the cooking within a microwave oven. It is this positioning, and its proven importance, that is addressed with the subject high efficiency cooking container for microwave ovens.

The present invention provides an inexpensive microwave cooking container for cooking food in a vertical position in a microwave oven which significantly increases even cooking throughout the food. The container can be thermo formed from a thin plastic material and so has nomininal rigidity. Consequently, a relatively small amount of material is needed to construct the container; it can be disposed of after being used once. The weight of the food provides stability to the container in a vertical position. The container is unstable in a vertical position when empty, but it is stable when full.

The weight of the food shifts the center of gravity of the filled container to within the container itself (that is, above a portion of a sidewall upon which the container is resting in its vertical position). If the container were initially stable without the food, the weight of the food could shift the center of gravity of the container and the food far beyond the container, thereby causing it to tip over. The container is designed so that its center of gravity is outside of the container when it is empty. The weight of the food shifts the center of gravity centrally within the container, thus providing stability to both the container and the food therein.

Because the container has no supporting base extensions, it can be readily positioned horizontally after it is removed from the oven, and, accordingly, used as a serving tray for the cooked food. Furthermore, because of the absence of such supporting extensions, a plurality of the containers can be packaged together in a shipping case with minimal interference between containers. Also, because the container is not a closed structure, but rather has an opened top surface, it provides easy packaging of the food at the factory and easy access to the food by the consumer at home.

Food can be stored in the container prior to cooking. Thus, the container provides a vehicle for storing food, cooking food, and serving food after it has been cooked. All of these operations are performed without transferring the food from the container.

The container provided is inexpensive to manufacture, requires a relatively small amount of material to construct, can be disposed of after use, and can be used for storing food, cooking food, and serving food after it has been cooked. Because food can be cooked vertically within the container and thus be centered in the oven to absorb an optimum amount of both direct and reflected microwave radiation, the food is more evenly cooked throughout its mass, than were it cooked in any other attitude within the oven category.

SUMMARY OF THE INVENTION

The present invention provides a cooking container formed from material which is transparent to microwave radiation which is useful for storing food prior to cooking, for cooking food in a microwave oven, and for serving the cooked food after it has been removed from the oven. In accordance with the concepts of the present invention, food can be cooked in a container in a vertical upright position. By centering the upright container within the microwave oven, the food is exposed to and absorbs an optimum amount of direct microwave radiation and microwave radiation reflected from the sidewalls and bottom of the oven, and accordingly, is cooked more evenly throughout than if it were laid flat in the oven.

The container is designed such that it is unstable in an upright position without food, but is stable in such upright position when food is added thereto. Specifically, the center of gravity of the unloaded container, which is away from the center of the container, is shifted to a position within the container by the weight of the food. Accordingly, the weight of the container and the food together comprises a system having a center of gravity which is centralized within the container, thereby providing stability to the container in a vertical upright position. This permits the container to be inexpensively blow-molded, injection molded or thermo formed from thin, and so nonrigid, plastic.

When horizontal, the container includes a base and peripheral sidewalls extending angularly outwardly from the base. The sidewall at one end includes portions extending vertically down from the top, but not necessarily as far down as the base. These portions are vertical supports. The container can be laid flat on its base and the vertical supports will not be in the way. By the same token when the container is in its vertical position, the center of gravity is towards the heavier upright base, away from the center of the container. Accordingly, the container tips in the direction towards the upright base.

However, when food is placed within the container, the weight of the food shifts the center of gravity of the food and the container towards the center of the container above the vertical supports extending from the end of the peripheral sidewall upon which the container is resting. Consequently, the container and the food are stable in an upright position.

The open top of the container can be sealed by a thin cellophane or plastic film when the container is in its upright position to hold the food therein. However, after the food is cooked and the container is removed from the oven, this thin sealing film can be removed easily from the top to provide access to the food within the container. The thin film also helps keep the food fresh when it is stored prior to cooking.

Thus, the container can be used for displaying or storing food in a vertical position, cooking food in a vertical position, and serving cooked food in a horizontal position, without the necessity of transferring the food. Each of these operations is performed while the food is within the same container, thus eliminating the inconvenience of transferring the food to different vessels. Because the containers require a relatively small amount of material to manufacture and are thus produced inexpensively, they can be used once and then disposed.

Most importantly, food can be cooked within the container in a vertical upright position centered within a microwave oven, thereby absorbing an optimum amount of direct microwave radiation and microwave radiation reflected from the sidewalls and lower and upper surfaces of the oven. Consequently, the food is cooked much more evenly throughout than it would be if cooked by conventionally laying it flat in the oven.

BRIEF DESCRIPTION OF THE DRAWINGS

FIG. 4 is a perspective view of the container of FIG. 1.

FIG. 5 is a perspective view of another embodiment of the present invention.

FIG. 6 is a perspective view of a third embodiment of the present invention.

DETAILED DESCRIPTION OF THE DRAWINGS

Figure 1:
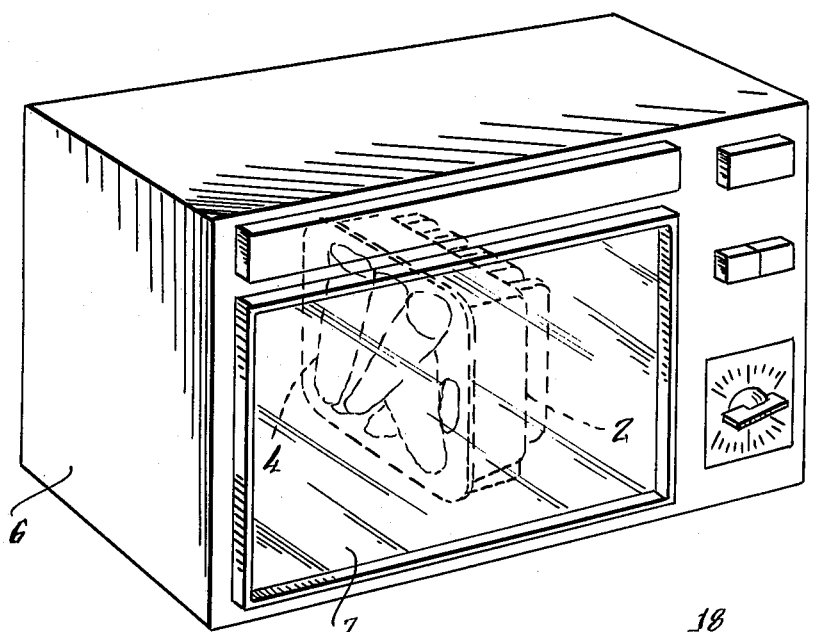
FIG. 1 is a perspective view of one embodiment of the present invention. The container is seen holding food in an upright standing position inside of a microwave oven.

FIGS. 1-8 of the drawing illustrate four embodiments of a microwave food cooking container in accordance with the present invention. These embodiments are sized differently to accommodate different kinds of food.

All of the containers have a base 8 and peripheral sidewalls angularly extending from the base. At least one end sidewall includes portions 32 and 34 extending vertically downwardly from adjacent the top edge, but not necessarily all the way to the base. Thus, the container can stand upright on the end sidewall 14 when food is inside of the container, and can also be laid flat on their bases.

Food cooked in the upright containers can be centered in a microwave oven to absorb an optimum quantity of direct and reflected microwaves, thereby ensuring the even cooking of the food. The cooked food can be served directly from the containers by removing the containers from the oven and laying them flat on their bases.

The containers can be inexpensively molded from a material which is transparent to microwave radiation such as plastic, and accordingly can be disposed of after one use. The containers may also be made from paperboard, which is transparent to microwaves.

A First Embodiment

(A) Structure

Referring to FIGS. 1-4 and 8, a first embodiment of the present invention is disclosed.

FIG. 1 shows a container 2 holding food 4 in the center of a microwave oven 6. The container is standing in an upright vertical position, supported by the bottom surface 7 of the oven.

Figure 2:
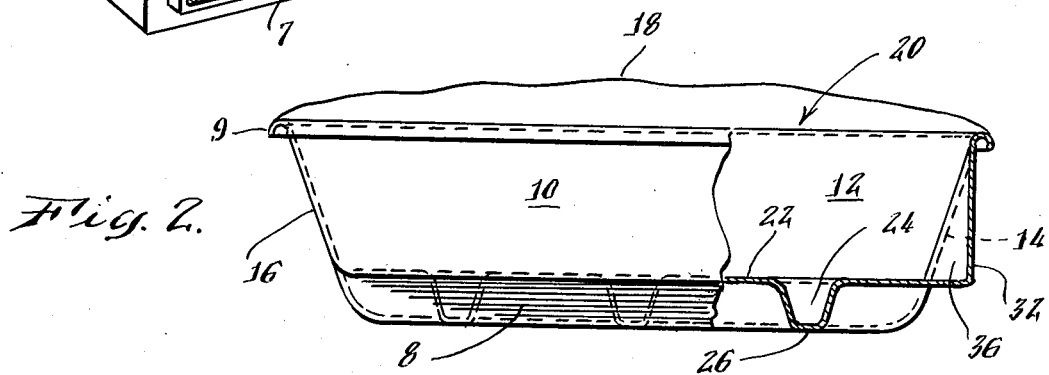
FIG. 2 is a side elevational view of the container of FIG. 1, without the food. The container is horizontal as it would be when used for serving food.
Figure 3:
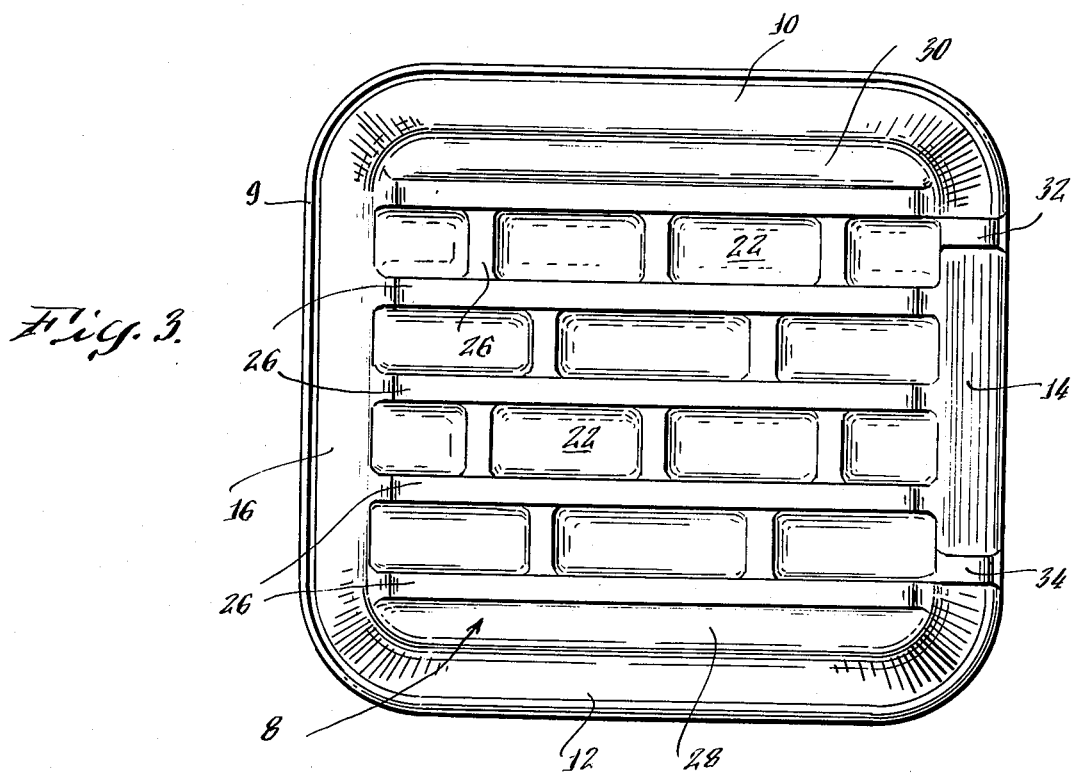
FIG. 3 is a bottom plan view of the container of FIG. 1.
Figure 1A:
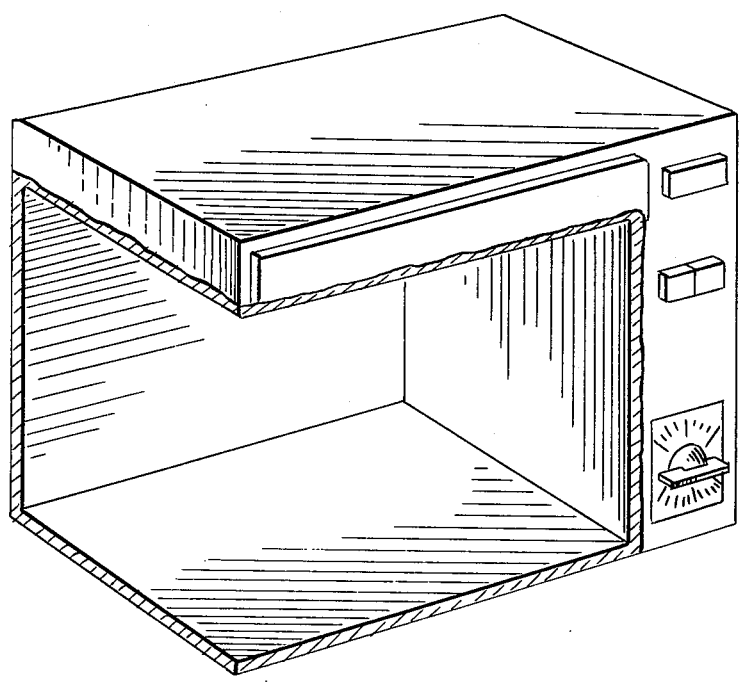
FIG. 1A is a perspective view of a microwave oven cavity in which the ratio of height to width to depth is 12:14:10.
Figure 1B:
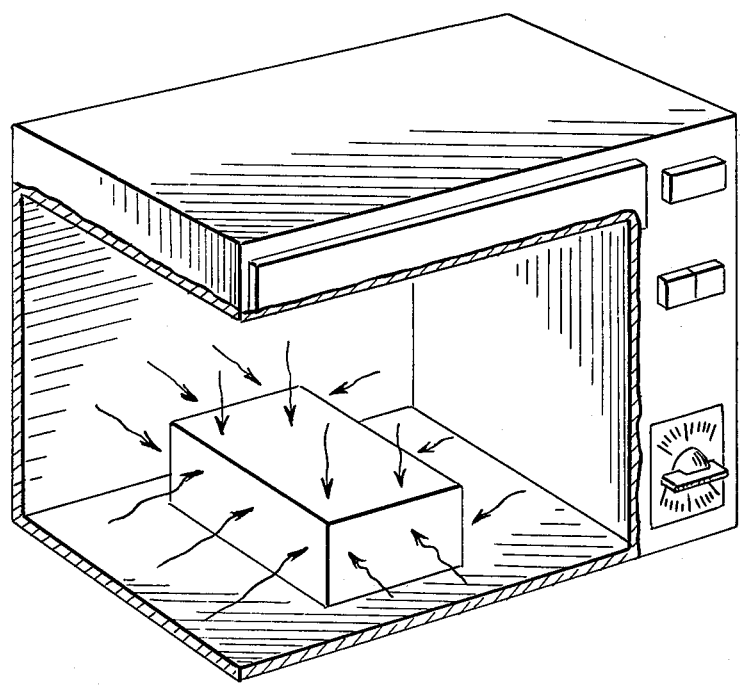
FIG. 1B shows a block of food laid horizontally on the floor of the oven cavity of FIG. 1A.

As more clearly shown in FIGS. 2-4, the container has a closed bottom surface 8 which is generally square-shaped with rounded corners. Peripheral sidewalls 10 and 12 and end portions 14 and 16 join the bottom surface at its periphery and extend outwardly and upwardly therefrom. The sidewalls and end portions, which are at obtuse angles to the bottom surface, are joined to each other, and together with the bottom surface, define the closed bottom, open top container 2. End portion 14 includes outwardly extending vertical supports 32 and 34.

A thin wrap or film 18 can be heat fused to the container to seal its open top portion 20 to hold the food in the container in its upright vertical position in the oven (as shown in FIG. 1), or on a display shelf in the store. As seen best in FIGS. 2 and 4, the upper edge of the peripheral sidewalls and end portions of the container define a downwardly extending lip 9. The outer surface of this rounded lip provides a surface area upon which the film 18 can be fused to the container. Additionally, the rounded lip will not cut the film, as might occur with a straight edge. The lip also prevents the film 18 from shrinking or pulling inwardly into the container.

The bottom surface 8 of the container has a series of elevated ribs or platforms 22 for strengthening the container. These ribs define a network of channels 24. When food is laid flat on the bottom surface of the container, the food is held above the channels 24 by the elevated platforms 22 and the channels serve to trap any drippings from the food. The container can be laid in a horizontal position on the flat bottom portions 26 of the channels 24, shown in FIGS. 2 and 3.

Two ridges 28 and 30 are defined in the container near the sidewalls 10 and 12 to further strengthen and rigidify the overall container structure.

The vertical supports 32 and 34, which are hollow triangular shaped legs, extend outward from the obtusely angled lower end portion 14 of the container. These supports, which support the container in its vertical upright position, are spaced equal distances away from the ends of the lower end portion 14 and also extend across the major portion of the width of the lower end portion 14. In this manner, the weight of the container and the food in the container is evenly distributed directly above the supporting legs when the container is upright. Alternatively, these two supports could be replaced by one wider, centrally positioned support extending from the lower end 14 of the container.

The vertical supports 32 and 34 do not interfere with the container when it is laid flat on its bottom surface. As seen from FIG. 2, the supports are elevated from the bottom of the container and directed away from the interior of the container when the container is positioned horizontally.

The hollow supports 32 and 34 define grooves 36 and 38 below the lower end portion 14 when the container is standing upright on the supporting legs. These grooves catch and hold liquid, as for example, water dripping from cooking food.

The container, which can be disposable or nondisposable, is made by injection molding, blow molding or thermo forming from a material which is transparent to microwave radiation. An inexpensive material, such as lightweight plastic can be used to manufacture a disposable container. The disposable container should preferably be nonrigid or flexible.

Alternatively, the disposable container can be made from paperboard. A nondisposable container can be made from a ceramic, which like plastic, is transparent to microwave radiation. In the preferred embodiment, the container is also made from an optically transparent material so that food can be inspected by a consumer prior to purchasing, or while it is cooking in an oven.

Because the container is made of a material which is transparent to microwave radiation, microwaves will pass through the container to penetrate and be absorbed by the food in the container during cooking.

The thin wrap 18 used to seal the opened top of the container preferably should be made from a material which is both optically transparent and transparent to microwave radiation to permit both visual inspection of the contents and transmission of microwave radiation.

The disclosed container is useful for storing food prior to cooking, for cooking food, and as a serving tray for the cooked food. Advantageously, each of these steps can be performed without transferring the food from the container.

(B) Principles Of Operation

The above described microwave cooking container can be used to cook food more evenly than they are presently cooked in known containers. The cooking container, which is unstable and cannot stand upright on the triangular vertical supports 32 and 34 when the container is empty, is stable and can stand vertically upright on its vertical supports when food is in the container. As previously noted, the weight of the food shifts the center of gravity of the container and the food towards the center of the container and above the vertical supports. Food is cooked in the upright container centered on a supporting surface within a microwave oven thus positioning the food proximate to the geometrical center of the oven. Consequently, because of its central position within the oven, the centered food absorbs an optimum quantity of both direct microwave radiation and microwave radiation reflected from the inner surfaces of the oven and is heated quickly. In practice, it has been found that cooking food upright in a microwave oven, as opposed to cooking food horizontally, increases the even exposure of energy throughout the mass of the food being cooked. Because the loaded container is self balanced and does not have any supporting extensions behind its bottom surface to hold it in an upright position, the container can be removed from the oven, laid flat on its bottom surface (that is, the bottoms 26 of channels 24) and used as a serving tray for the cooked food.

Figure 8:
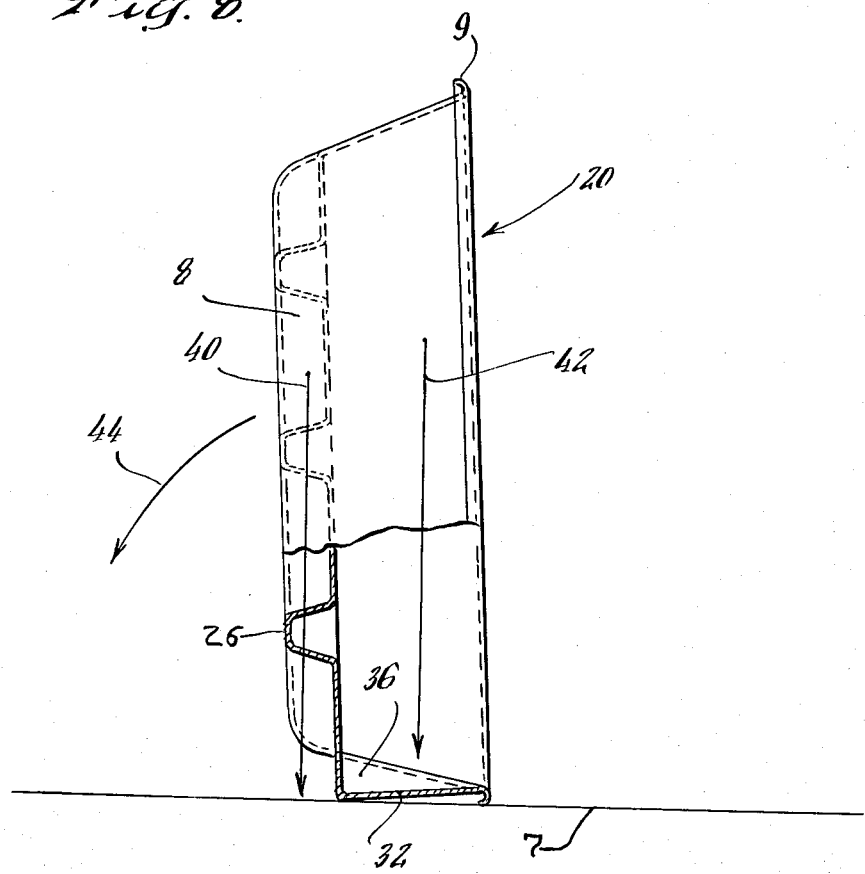
FIG. 8 is a side elevational view of the embodiment of FIG. 2. The container is in a vertical upright position as it would be when used for holding food in the microwave oven.

Numeral 40 of FIG. 8 shows the approximate center of gravity of the container when it is standing upright on its vertical supports 32 and 34 and is not holding food. Because the bottom surface 8 is heavier than the opened top portion 20, the center of gravity of the upright container is towards the bottom surface 8 and away from the opened top portion 20. (That is, towards the left of FIG. 8). The center of gravity of the empty container is not centered above the vertical supports but is either beyond them or near their edges, causing instability. Accordingly, the weight of the empty container produces a torque about the vertical supports in a direction towards the bottom surface 8 of the container, (shown by arrow 44 of FIG. 8), and causes the container to pivot about the vertical supports and tip over onto its bottom surface.

When food is placed inside of the container, the center of gravity of the container and the food is shifted away from the bottom surface 8 and towards the open top portion 20 because the concentration of weight of the container and the food moves forward and is centralized within the container. Numeral 42 of FIG. 8 shows the approximate position of the center of gravity of the loaded container which is above the container's vertical supports 32 and 34. Because the concentration of weight is above the center of the vertical supports 32 and 34, the container will be stable. The weight of the loaded container is directed downwardly onto the vertical supports and keeps the vertical supports flush against a supporting surface 7, such as an oven floor. The loaded container is balanced and can support itself in an upright position as shown in FIG. 8 without the use of any braces or other supporting members extending from the back of the bottom surface 8 and abutting against the supporting surface 7.

The above-described cooking container can be used to cook food in a microwave oven and also used as a flat serving tray for the cooked food. The wrap or film 18, which can be heat fused to the rounded upper lip 9 of the container, helps hold the food in the upright container, and is also helpful for retaining heat within the container after the container has been removed from the oven. After the food has been cooked, the container is removed from the oven and laid flat on its bottom surface. As noted before, the vertical supports 32 and 34 do not extend from the bottom surface, and consequently, do not intefere with the container in this horizontal position. When the food is to be served, the wrap 18 is simply torn from the container, and the container is used as a serving dish.

The container increases cooking efficiency and reduces the uneven degree of energy penetration in other ways in addition to centering the food in the oven for optimum penetration by microwaves, as discussed above. For example, a liquid can be added to the channels 24 (when the food is to be cooked with the container lying horizontally) or the grooves 36 and 38 (when the food is to be cooked standing in an upright position). Thus, regardless of the position in which the food is cooked, a pool of liquid can be provided below the cooking food. Liquids absorb a substantially greater amount of microwave energy than solids. Thus, liquid (preferably water) in the channels and grooves of the container will absorb a large quantity of microwave radiation and be vaporized into steam. The steam rises and contacts the food above, further heating it and cooking it. The wrap 18, which seals the open top 20 of the container, retains the steam within the container but should be slightly perforated to allow escape of some steam to avoid any excessive build up of pressure within the container. The wrap 18 also helps retain the liquid in the channels inside of the container when the container is in its vertical upright position.

When cooking certain foods (as, for example, certain vegetables) it is not necessary to add liquid to the channels or grooves because the food itself expels water when it is penetrated by microwave radiation. The water drips down into the channels 24 or grooves 36 and 38 (depending on whether the container is in a horizontal or vertical position) and provides the necessary liquid pool for steaming the cooking food.

The container further ensures the even cooking of the vegetables by elevating them above the bottom of the microwave oven. When the container is laid horizontally on its bottom surface 8 on the floor of a microwave oven, food in the container is elevated above the oven floor by the food supporting platforms or ribs 22 (See FIGS. 2–4). When the container is standing in its upright position (on its lower end portion 14) in a microwave oven, food in the container is elevated above the floor of the oven by the vertical supports 32 and 34 (See FIGS. 1 and 8).

It is advantageous to elevate the food because microwave radiation reflected from the oven floor will strike the underside of the cooking container. Because the container is made of material transparent to microwaves, the microwave radiation reflected from the floor of the oven is transmitted through the underside of the container and is absorbed by the food therein.

In summary, the present embodiment of the invention increases microwave cooking efficiency by increasing the evenness of the penetration in at least three different ways. First, by cooking the food in a vertically upright position, the food can be centered in the oven and absorb an optimum quantity of both direct microwave radiation and microwave radiation reflected from the sidewalls of the oven. Second, the container provides means for steaming the cooking food. Third, the container elevates the food so that the food absorbs microwave energy reflected from the floor of the oven.

Other Embodiments Of The Container

Figure 7:
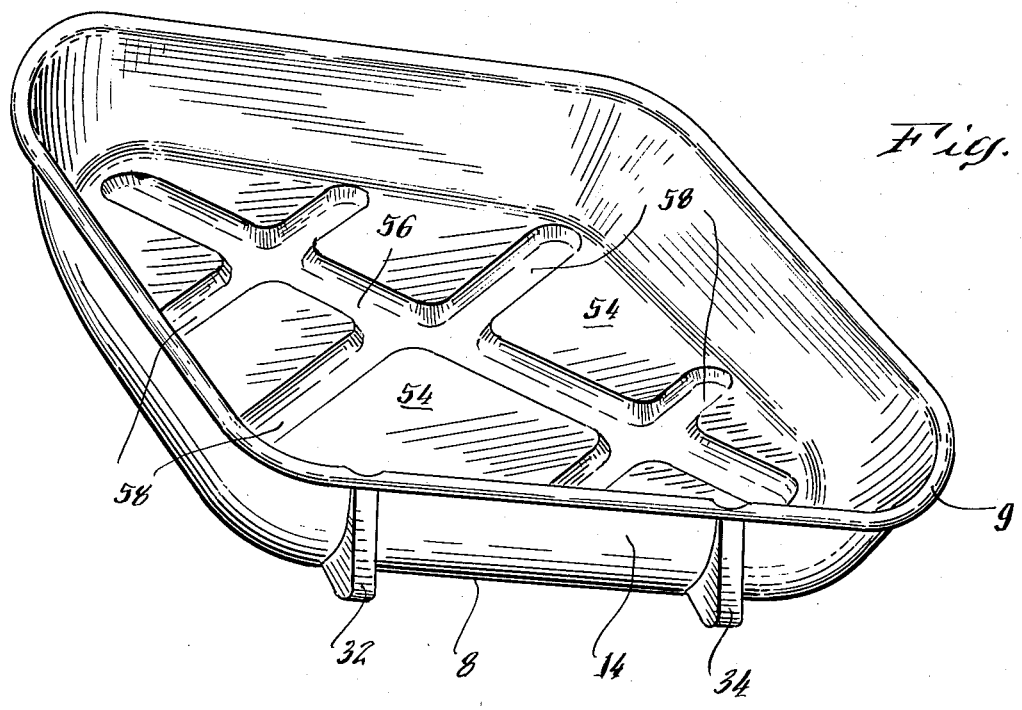
FIG. 7 is a perspective view of a fourth embodiment of the present invention.

FIGS. 5, 6 and 7 illustrate three other embodiments of the present invention.

The embodiments of FIGS. 5 and 6, like that of FIGS. 1–4 and 8 show a generally square or rectangular opened top food container which can be used to significantly even out cooking temperatures in a microwave oven in accordance with the same principles utilized by the first embodiment.

The basic difference between the first discussed container and the embodiments shown by FIGS. 5 and 6 is the difference in the shapes of the container. The FIG. 1 container is generally square shaped, the FIGS. 5 and 6 containers are rectangular. Both have rounded corners. The different embodiments illustrate three different arrangements of the food supporting platforms (shown by number 46 in FIG. 5 and by number 48 in FIG. 6) and the channel network (shown by number 50 in FIG. 5 and number 52 in FIG. 6) defined by the food supporting platforms on the bottom surface of the container.

Thus, the FIGS. 5 and 6 embodiments illustrate different arrangements of the basic features of the FIG. 1 embodiment useful to accommodate food of differing sizes and shapes.

The embodiment shown by FIG. 7 also is a container having the advantageous features of the previously discussed embodiments. However, this container is diamond shaped and has larger food supporting platforms (shown by number 54) than any of the previously discussed embodiments. The platforms are positioned to define a network of channels including one central channel 56 extending along the longitudinal center of the bottom surface of the container. A series of smaller channels 58 extend from the periphery of the container and intersect the central channel at right angles.

This later embodiment of the invention is useful because it provides a different shaped container to accommodate food that might not fit into the other embodiments.

Each of the last three embodiments disclosed has a base or bottom generally shown by the numeral 8, a peripheral end wall 14 which extends from the base, and two vertical supports 32 and 34 extending outwardly from the end wall. The containers, which are unstable on their vertical supports when empty, are stable in an upright position on the vertical supports when loaded with food in accordance with the same principals discussed regarding the first embodiment.

The embodiments discussed herein provide four different container structures which are useful for even cooking of food in a microwave oven by centering the food in a microwave oven to absorb an optimum quantity of both direct and reflected microwave radiation. The particular container used depends upon the size and the shape of the food to be cooked. Each of the disclosed containers can also be used as a serving tray for the cooked vegetables and also to store or display the food prior to cooking.

The following table is provided to illustrate specific foods and the embodiment of the invention which is most adapted to containing these foods. The table is intended to be illustrative only and not inclusive of all foods with which the containers can be used.

| FOOD | SUGGESTED EMBODIMENT |
|---|---|
| A. Fresh Vegetables | |
| 1 Artichokes | FIG. 7 |
| 2 Asparagus | FIG. 5 |
| 3 Green Beans | FIG. 6 |
| 4 Broccoli | FIG. 7 |
| 5 Brussel Sprouts | FIG. 4 |
| 6 Carrots (baby) | FIG. 5 |
| 7 Cauliflower | FIG. 7 |
| 8 Sweet Corn | FIG. 4 |
| 9 Potatoes | FIG. 7 |
| 10 Squash | FIG. 7 |
| 11 Sweet Potatoes | FIG. 7 |
| B. Meat/Poultry | |
| 1 Hamburger | FIG. 5 |
| 2 Lamb Chops | FIG. 4 |
| 3 Steak | FIG. 4 |
| 4 Pork Chops | FIG. 4 |
| 5 Chicken Legs & Breasts | FIG. 7 |
| 6 Turket Roast | FIG. 7 |
| 7 Ham Steaks | FIG. 4 |
| 8 Canadian Bacon | FIG. 4 |
| 9 Pork Sausage | FIG. 5 |
| 10 Strip Bacon | FIG. 5 |
| 11 Rock Cornish Game Hens | FIG. 7 |
| C. Cold Cuts & Sandwich Fillers | FIGS. 4 & 6 |
| D. Frozen Baked Goods | |
| 1 Waffles | FIG. 4 |
| 2 Pancakes | FIG. 4 |
| 3 French Toast | FIG. 4 |
| 4 Sweet Rolls | FIG. 4 |
| 5 Coffee Cake | FIG. 4 |
| 6 Muffins/Bread | FIG. 4 |
| 7 Dessert Items | FIGS. 5 & 6 |
| E. Frozen Vegetables | FIGS. 4, 5 & 6 |
| F. Frozen Fish/Sea Food | FIGS. 4, 5 & 6 |
| G. Eggs | FIG. 6 |

It is believed that modifications of the above described embodiments of the invention will be apparent to those skilled in the art. Accordingly, the descriptions provided herein are meant to be illustrative only, and not limiting or restrictive of the scope of the invention, that scope being defined by the following claims and all equivalents thereto.

I claim:

1. A cooking container for use in microwave cooking of food in a microwave oven, said container including:
    a base and integral upwardly extending sidewalls and end portions to define an open-top food container, said sidewalls and end portions extending upwardly from the periphery of said base, the length of said end portions being no greater than the length of said sidewalls,
    at least one of said end portions having at least one vertical support extending downwardly from said one end portion, but extending no further than the plane of said base,
    said container being made of material which is transparent to microwave radiation,
    said container being so dimensioned such that (1) its center of gravity, when said container is in a vertical position with said vertical support being supported on a supporting surface in said microwave oven and said base of said container being substantially perpendicular to said supporting surface in said microwave oven, is proximate to said base and not substantially aligned above said vertical support to cause said container to be unstable and (2) the center of gravity of said container and contained food is more nearly centered over said vertical support when food is in said container to provide stability to said container in its said vertical position supported on said vertical support,
    whereby food can be cooked in a microwave oven in said vertical position of said container for absorbing an optimum quantity of both direct microwave radiation and microwave radiation reflected from the microwave oven surfaces.

2. A cooking container as claimed in claim 1 wherein said container is formed from plastic.

3. A cooking container as claimed in claim 1 wherein said container is formed from paperboard.

4. A cooking container as claimed in claim 1 wherein said at least one vertical support extending from said end portion elevates food contained within said container above the supporting surface of said microwave oven when said container is in its vertical position in said oven such that microwave radiation reflected from the bottom of the oven penetrates and is absorbed by said food within said container.

5. A cooking container as claimed in claim 4 wherein said vertical support is hollow and has an opening therein for providing a passageway between the interior of said container and the interior of said vertical support so that liquid drippings from said cooking food drip downwardly into said hollow support and are collected therein when said container is in its vertical position.

6. A cooking container as claimed in claim 4 wherein said vertical support is positioned proximate to the center of said end portion of said container such that at least a portion of said vertical support is in alignment with said center of gravity of said container and said food when said container is in its said vertical position.

7. A cooking container as claimed in claim 1 wherein said base is flat so that said container can be laid flat on said base and used as a serving tray for cooked food after said container is removed from said oven.

8. A microwave cooking container as claimed in claim 1 further including food elevating means carried on said base of said container to elevate the food in said container above the supporting surface of said microwave oven when said container is laid on said base surface on the supporting surface of said microwave oven,
whereby microwave energy reflected from the supporting surface of said microwave oven penetrates said food within said container.

9. A microwave cooking container as claimed in claim 8 in which at least one channel for containing liquid is defined by said food elevating means.

10. A cooking container as claimed in claim 1 further including means for sealing said opened top of said container, said means for sealing comprising a film which is transparent to microwave radiation.

11. A cooking container as claimed in claim 10 wherein said film is optically transparent.

12. A cooking container as claimed in claim 1 wherein said container is formed from a nonrigid material.

13. A cooking container as claimed in claim 1 wherein said container is optically transparent so that said food within said container is visible from outside of said container.

14. In a cooking container for use in microwave cooking of food in a vertical position in a microwave oven, said container including a base and integral upwardly extending sidewalls and end portions to define an opened top food container, said sidewalls and end portions extending upwardly from the periphery of said base, the length of said end portions being no greater than the length of said sidewalls,
the improvement comprising:
at least one vertical support extending outwardly from one of said end portions but extending no further than said base,
said container being made of material which is transparent to microwave radiation,
said container having a center of gravity, when in a vertical position supported on said vertical support on a supporting surface in said microwave oven, that is proximate to said base and not substantially aligned above said vertical support, thereby causing said container to be unstable,
said container being so dimensioned as to have the center of gravity of said container and contained food more nearly centered over said vertical support when said food is in said container to provide stability to said container in its said vertical position supported on said vertical support,
whereby food can be cooked in a microwave oven in said vertical position of said container for absorbing an optimum quantity of both direct microwave radiation and microwave radiation reflected from the oven surfaces.

15. A cooking vessel as claimed in claim 14 wherein said at least one vertical support is centered on said one of said end portions.

16. A cooking vessel as claimed in claim 14 including a plurality of equidistantly spaced vertical supports extending from said one of said end portions.

17. A method of cooking food in a microwave oven, said method including the steps of:
placing said food in a container having a base and integral extending sidewalls and end portions, the length of said end portions being no greater than the length of said sidewalls, at least one of said end portions having a vertical support extending therefrom, said container being dimensioned such that it is stable when supported on said vertical support on a supporting surface in said oven, said container being formed from material which is transparent to microwave radiation,
placing said container in said vertical position with said vertical support being supported on said supporting surface inside of said microwave oven so that said food contained therein is in an upright position within said oven for absorbing microwave radiation reflected from the sides of said oven.

18. A method as claimed in claim 17 further including the step of elevating said food within said container above said supporting surface inside said oven so that microwave radiation reflected upwards from said supporting surface penetrates said food thereabove.

19. A method as claimed in claim 17 further including the step of centering said container on said supporting surface inside of said microwave oven.

* * * * *